(12) United States Patent
Nicholas

(10) Patent No.: US 8,551,208 B2
(45) Date of Patent: Oct. 8, 2013

(54) PLASMA TREATED FILTER

(75) Inventor: Timothy Nicholas, Alton (GB)

(73) Assignee: General Electric Company, Schenectady, NY (US)

( * ) Notice: Subject to any disclaimer, the term of this patent is extended or adjusted under 35 U.S.C. 154(b) by 338 days.

(21) Appl. No.: 12/947,508

(22) Filed: Nov. 16, 2010

(65) Prior Publication Data

US 2012/0117930 A1    May 17, 2012

(51) Int. Cl.
*B01D 39/14*    (2006.01)

(52) U.S. Cl.
USPC .......... 55/524; 55/495; 55/528; 96/15; 96/66; 96/69; 96/95; 95/59

(58) Field of Classification Search
USPC ............... 55/495, 524, 528, DIG. 5, DIG. 39; 96/66, 69, 95, 15; 95/59; 429/569
See application file for complete search history.

(56) References Cited

U.S. PATENT DOCUMENTS

| | | | |
|---|---|---|---|
| 6,419,871 B1 * | 7/2002 | Ogale | 264/423 |
| 2002/0117054 A1 | 8/2002 | Ogale | |
| 2007/0199891 A1 * | 8/2007 | Mabuchi et al. | 210/500.23 |
| 2011/0209622 A1 * | 9/2011 | Hiner et al. | 96/189 |

* cited by examiner

*Primary Examiner* — Robert Clemente
*Assistant Examiner* — Karla Hawkins
(74) *Attorney, Agent, or Firm* — Fletcher Yoder, P.C.

(57) ABSTRACT

A method, including receiving a turbine filter unit in a plasma treatment system, wherein the turbine filter unit comprises a filter media assembled with a framework, and applying at least one plasma treatment coating to the turbine filter unit via the plasma treatment system.

20 Claims, 4 Drawing Sheets

PLASMA TREATED FILTER

BACKGROUND OF THE INVENTION

The subject matter disclosed herein relates to filters, and more particularly to filters treated with plasma.

A gas turbine engine combusts a fuel-air mixture to generate hot combustion gases, which drive rotation of turbine blades in a turbine section. The gas turbine engine may be used to drive an electrical generator or another load. The gas turbine engine intakes air through an air filter, which removes particulate to protect internal components of the gas turbine engine. Unfortunately, existing air filters may be inadequate for certain environmental conditions, such as heavy fog, dust/sand storms, and other harsh conditions. An inadequate air filter may cause operational problems for the turbine, such as, unforeseen shutdown or increased performance degradation. Thus, under such harsh conditions, the installed air filter would require replacement with another more suitable air filter, thereby resulting in waste of the installed air filter.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes receiving a turbine filter unit in a plasma treatment system, wherein the turbine filter unit comprises a filter media assembled with a framework, and applying at least one plasma treatment coating to the turbine filter unit via the plasma treatment system.

In a second embodiment, a method includes receiving a prefabricated turbine filter unit in a plasma treatment system, and applying at least one plasma treatment coating to the prefabricated turbine filter unit via the plasma treatment system, wherein the at least one plasma treatment coating provides a moisture barrier to protect a gas turbine engine from moisture in an air intake.

In a third embodiment, a system includes a turbine filter unit including a filter media assembled with a framework, wherein the turbine filter unit includes at least one plasma treatment coating disposed over the filter media and the framework, and the at least one plasma treatment coating provides a moisture barrier to protect a gas turbine engine from moisture in an air intake.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to turbine filters that are plasma treated post fabrication. In other words, the turbine filters may be substantially or completely covered with a plasma coating, which may extend over both filter media and non-filter media (e.g., frame). For example, a turbine filter may be purchased from a supplier and then treated with a plasma coating to enhance certain properties. By further example, the plasma coating may be applied on site and/or in response to site-specific environmental conditions, thereby converting an off the shelf turbine filter into a custom turbine filter rather than scrapping the filter. The plasma coating may be a common coating applied to all air filters, or an application specific coating helpful in specific types of environments. For example, the plasma coating may be a hydrophobic coating, a hydrophilic coating, or a combination thereof. In some embodiments, a filter may have a hydrophobic coating on a first side of a filter and a hydrophilic coating on a second side of a filter. In still other embodiments, the filter may include multiple coatings one on top of the other. Although the plasma treated filters are discussed in context of gas turbine engines, the disclosed plasma coating of an off the shelf filter may be supplied to any type of filters in any industry.

Figure 1:
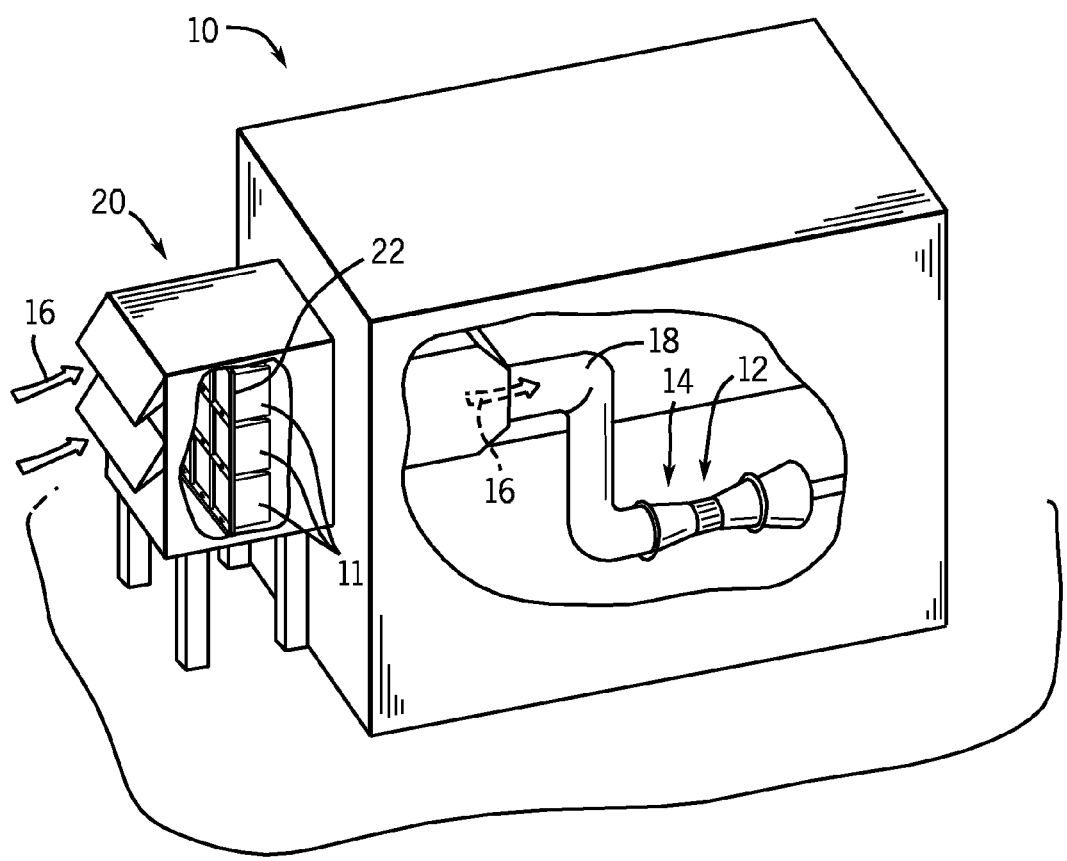
FIG. 1 is a perspective view of an embodiment of a power generation facility with plasma treated turbine air filters.

FIG. 1 is a perspective view of an embodiment of a power generation facility 10 that uses plasma treated filters 11. The power generation facility 10 includes a gas turbine engine 12 that generates electrical power. The turbine engine 12 includes an air compressor 14 that draws intake air 16 into the turbine engine 12 from the outdoors through air ducts 18. As the intake air 16 enters the facility, it first passes through a filter house 20. Inside the filter house 20, an array of filters 11, held by one or more filter frames 22, filter the intake air 16 to remove contaminants such as dust, dirt, moisture, salt, carbon and any other contaminants that may tend to reduce the performance of the turbine 12. The filter house 20 may be several stories high, and may house up to several hundred filters 11, which may be held by several filter frames 22. As discussed below, each filter 11 may be plasma treated after fabrication, e.g., on-site or in response to site-specific environment conditions.

Figure 2:
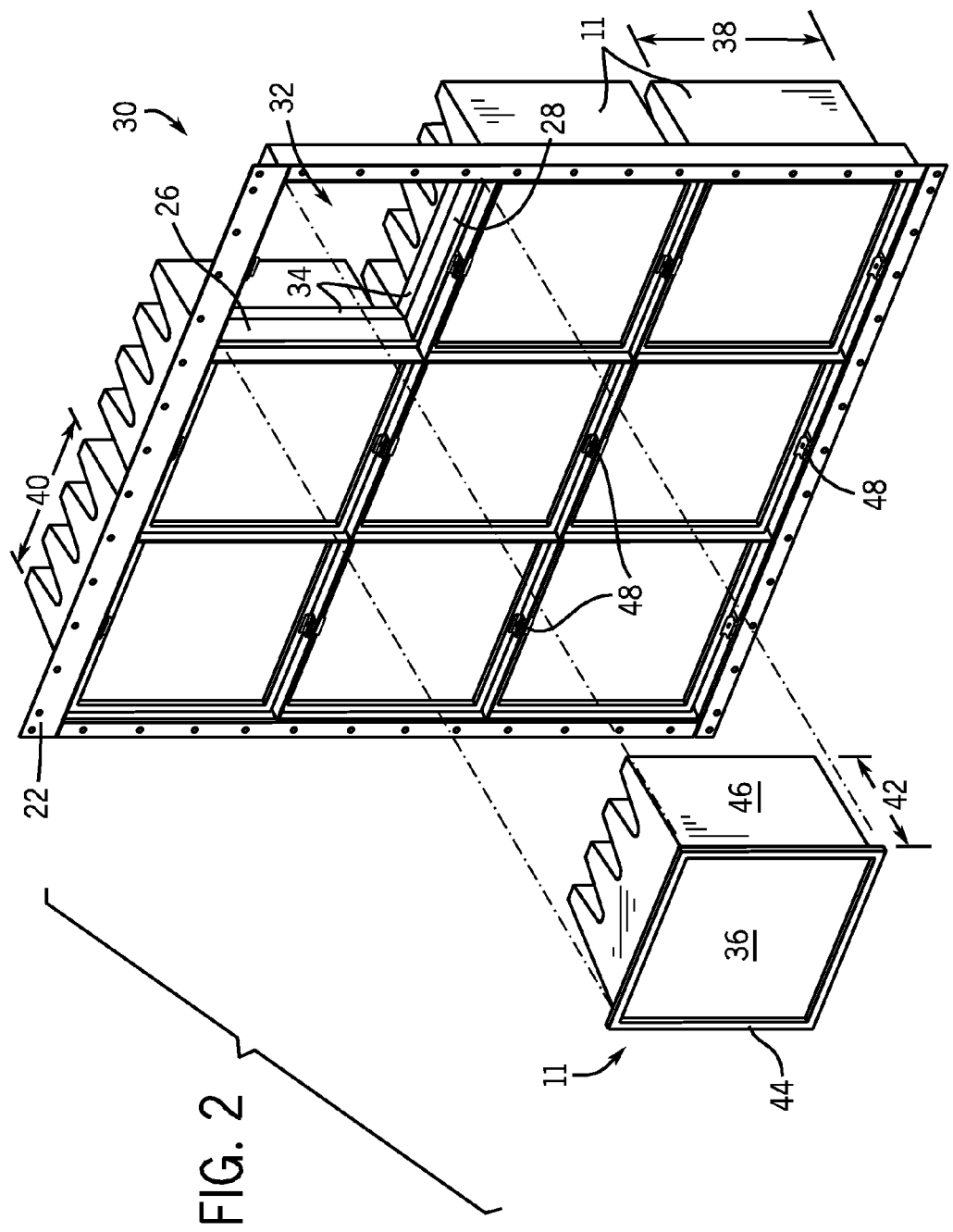
FIG. 2 is a perspective view of an embodiment of the filter frame of FIG. 1 with plasma treated turbine air filters.

FIG. 2 is a perspective view illustrating an embodiment of the filter frame 22 of FIG. 1. As shown in FIG. 2, the filter frame 22 includes a set of vertical support panels 26 and horizontal support panels 28 that define filter cells 30. The vertical support panels 26 and horizontal support panels 28 serve, in part, as dividers between the filter cells 30, each of which holds a single plasma treated air filter 11. Each filter cell 30 may include an aperture 32 through which the filter 11 may pass, and a sealing face 34 against which the filter 11 may be pressed to block air from flowing around the filter 11. The filter 11 may include a filter body 46 that passes through the aperture 32 and a sealing flange 44 disposed about the rim of the outward face 36 of the filter body 46. The sealing flange 44 may be configured to fit inside the filter cell 30 and may be pressed against the sealing face 34. A gasket may be disposed between the sealing face 34 and the filter flange 44 to provide an airtight seal between the filter 11 and the sealing face 34.

The filters 11 may be any suitable type, such as bag filters or mini-pleat filters, pulse cartridge filters for example. In some embodiments, the filters 11 may be high-efficiency AltairSupernova™ filters, available from General Electric of Schenectady, N.Y. Additionally, the filters 11 may also be any suitable size. For example, in some embodiments, the filter height 38 and width 40 may be approximate 600 mm, the filter depth 42 may be approximately 400 to 500 millimeters, and each filter 11 may weight approximately 15 kilograms. Additionally, in some embodiments, the filter cells 30 and/or the filter frame 22 may provide suitable drainage for moisture, which may collect on the outside of the filter 11. Also included in the filter frame 22 are several fasteners or latches 48, which hold the filters 11 within the frame and provide sufficient compression to the sealing flange 44 to provide the airtight seal between the filter 11 and the sealing face 34. Again, as discussed below, each filter 11 may include one or more plasma coatings (e.g., applied post fabrication) extending over both the filter media and non-filter media, such as the sealing flange 44, framework, support structure, or other non-filter element.

Figure 3:
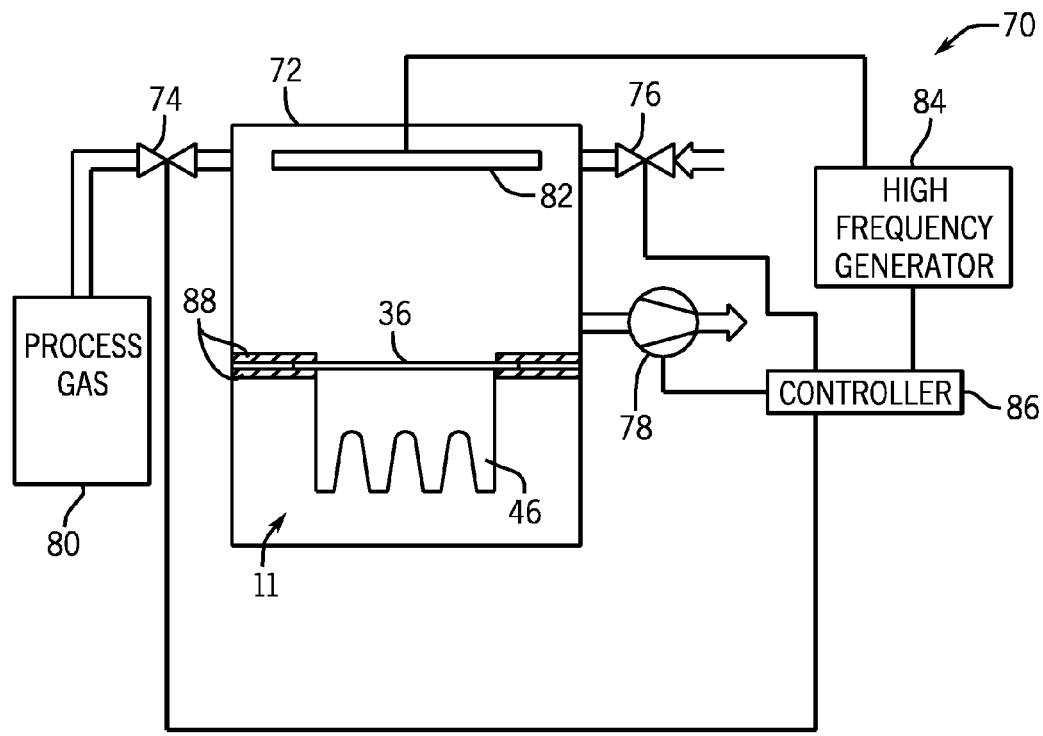
FIG. 3 is a block diagram of an embodiment illustrating a plasma treatment system for treating a gas turbine air filter.

FIG. 3 is a block diagram of an embodiment illustrating a plasma treatment system 70. The plasma treatment system 70 includes a chamber 72, gas valve 74, venting valve 76, vacuum pump 78, process gas 80, electrode 82, high frequency generator 84, controller 86, and frame 88. The plasma treatment system 70 may employ various steps to coat the filter 11. In the illustrated embodiment, controller 86 signals the vacuum pump 78 to evacuate the chamber 72, creating a threshold low-pressure condition in the chamber 72. Upon reaching a low-pressure condition, the controller 86 turns off the vacuum pump 78. After reaching the low-pressure condition, the controller 86 opens valve 74 to feed process gas 80 into the chamber 72, until reaching a working pressure. After reaching the working pressure, the controller 86 turns on the high frequency generator 84 that energizes the electrode 82. The electrode 82 ionizes the process gas 80 to create plasma, which then deposits on the filter 11 as a plasma coating. For example, the process gas 80 may be a plasma monomer that undergoes reactions and then deposits on the surface of the air filter 11 as a polymer. The type of monomer and the processing parameters will determine the resulting surface property (e.g., hydrophobic, hydrophilic, etc.). As the gas ionizes and deposits on the filter 11, the controller 86 activates the vacuum pump 78 removing the contaminated gas, while process gas 80 continuously enters container 72. Finally, after plasma coating the filter 11, the controller 86 closes valve 74 and turns off the high frequency generator 84. The controller 86 then opens valve 76 to vent the chamber 72 of process gas 80.

As illustrated, the system 70 includes a frame 88. The frame 88 allows for the plasma coating of different portions of the filter 11 with the same or a different plasma coating. For example, the frame 88 permits plasma coating of the outward face 36 while isolating the body 46 from the plasma. Similarly, after plasma coating the outward face 36, the filter 11 may be rotated in the frame 88 and the body 46 coated with the same or a different plasma coating, while isolating the outward face 36. In this manner, the outward face 36 and the body 46 may be treated with the same/different plasma coating.

Figure 4:
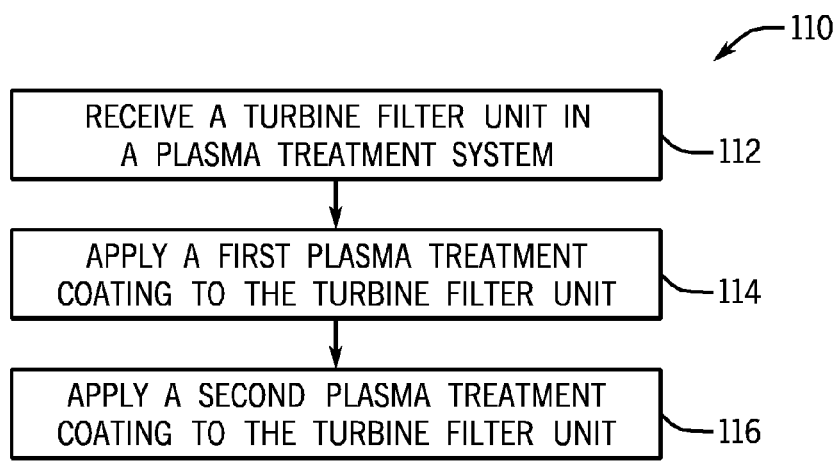
FIG. 4 is a flow chart illustrating an embodiment of a process for plasma treating a gas turbine air filter.

FIG. 4 is a flow chart illustrating an embodiment of a process 110 for plasma treating a gas turbine air filter 11. The process 110 begins by receiving a turbine filter 11 in a plasma treatment system (block 112). Once inside the plasma treatment system, a first plasma treatment coating is applied to the filter 11 (block 114). After applying the first plasma treatment, a second plasma treatment may be applied (block 116). Depending on the embodiment, the first plasma treatment coating may differ from the second plasma treatment coating. In embodiments with different plasma treatment coatings, the first and second plasma treatment coatings may be applied to the same region or different regions of the filter 11. For example, the plasma treatment coatings may be applied to upstream and downstream sides of the filter 11. In certain embodiments, the first region may be masked while applying the second plasma treatment coating to the second region, and the second region may be masked while applying the first plasma treatment coating to the first region. However, any suitable process may be used to apply one or more plasma treatment coatings. Furthermore, the coatings may differ in thickness, properties, materials, or a combination thereof. The application of different coatings will be discussed in detail below.

Figure 5:
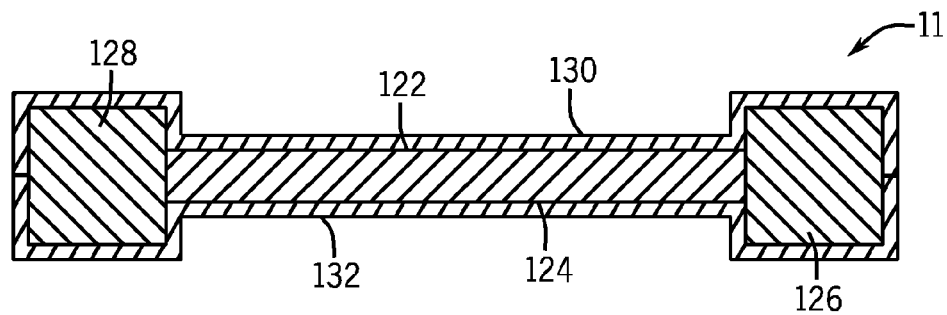
FIG. 5 is a cross-sectional side view of an embodiment of a plasma treated turbine air filter.

FIG. 5 is a cross-sectional side view of an embodiment of a plasma treated turbine air filter 11. The filter 11 defines a front face 122 (upstream or intake side), a rear face 124 (downstream or exhaust side), a first frame portion 126, and a second frame portion 128. Covering the front face 122 is a first plasma coating 130 and covering the rear face 124 is a second plasma coating 132. As illustrated, the coatings 130 and 132 extend over the first and second frame portions 126 and 128, which may be a single structure or separate structure. Depending on the embodiment, the first plasma coating 130 may be the same as or different from the second plasma coating 132. These plasma coatings may provide a moisture barrier, increase strength, wear resistance, or abrasion resistance in adverse environmental conditions (e.g., sandstorm, hail storm, or wind storm), increase resistance to corrosive environments (e.g., salt water), or any combination thereof. For example, the first plasma coating 130 may be hydrophobic, while the second plasma coating 132 is hydrophilic. As a result, the first plasma coating 130 (hydrophobic) blocks or repels water from passing through the filter 11, while the second plasma coating 132 (hydrophilic) absorbs water not repelled by the first plasma coating 130. The water absorbed by the hydrophilic coating 132 may then drain out of the filter 11 using gravity. Thus, filter 11 coated with two different plasma coatings may effectively reduce the amount of moisture that enters a gas turbine 12, by simultaneously repelling and absorbing moisture. In still other embodiments, the first and second plasma coatings 130 and 132 may be the same. For example, a hydrophobic coating and/or a hydrophilic coating may be on both sides of the filter 11. Table 1 below illustrates other possible combinations of plasma coatings, but is not intended to be limiting.

TABLE 1

| First Plasma Coating 130 | Second Plasma Coating 132 |
|---|---|
| Wear resistance | Hydrophobic |
| Wear resistance | Hydrophilic |
| Hydrophilic | Hydrophobic |
| Chemical/Corrosion Resistance | Hydrophobic |
| Chemical/Corrosion Resistance | Hydrophilic |

Figure 6:
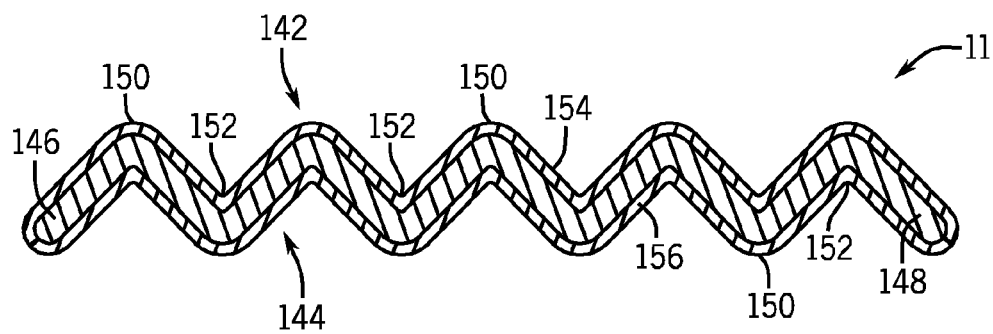
FIG. 6 is a cross-sectional side view of an embodiment of a plasma treated turbine air filter.

FIG. 6 is a cross-sectional side view of an embodiment of a plasma treated turbine air filter 11 without a frame. The filter 11 defines a first side 142 (upstream or intake side), a second side 144 (downstream or exhaust side), a first end 146, and a second end 148. As illustrated, the filter 11 defines a zigzag shape with protrusions 150 and recesses 152 between the first end 146 and the second end 148. In certain embodiments, the filter 11 may include an internal frame and/or filter media. For example, the frame may extend about the parameter (e.g., ends 146 and 148) of the filter 11 enclosing a zigzag shaped filter media. Although FIG. 6 illustrates the filter 11 as a zigzag shape, it may define a variety of different shapes (e.g., parabolic, concave, flat, corrugated ribbed, sinusoidal, etc.). As illustrated, the first and second sides 142, 144 include a respective first plasma coating 154 and a second plasma coating 156. The coatings 154 and 156 may be the same coating or different coatings. For example, the coatings 154 and 156 may represent a single common plasma coating. By further example, coating 154 may be hydrophilic, while coating 156 is hydrophobic and vice versa. As explained above, the combination of hydrophobic and hydrophilic coatings may more effectively protect a gas turbine 12 from moisture, rather than filter 11 covered by only a hydrophobic or hydrophilic coating.

Furthermore, the first and second plasma coatings 154 and 156 may add strength, corrosion/chemical resistance, and abrasion resistance to the filter 11. For example, first and second plasma coatings 154 and 156 may increase the strength of the filter 11. Thus, filter 11 with first and second coatings 154 and 156 may better resist stress caused by high winds, such as wind storms. Furthermore, the first and second plasma coatings 154 and 156 may provide abrasion protection of the filter 11. For example, a filter 11 operating in a desert environment may experience abrasive conditions caused by sand in the air. Therefore, the first and/or second plasma coatings 154 and 156 may provide an abrasive resistant outer-shell that limits wear and extends the life of filter 11. The first and second coatings 154 and 156 also may provide protection against mold and mildew. For example, a hydrophobic coating may repel water, thereby reducing the possibility of moisture, mold, and mildew penetration in the filter 11. In addition, the first and second plasma coatings 154 and 156 may provide protection in a corrosive environment, e.g., a salty environment.

Figure 7:
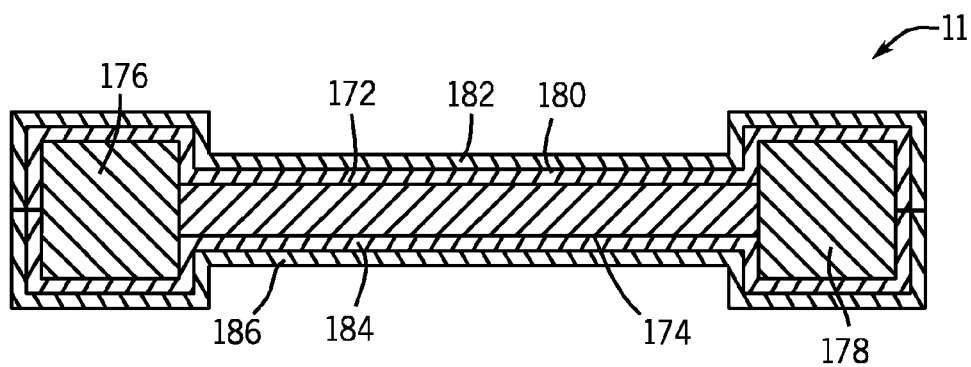
FIG. 7 is a cross-sectional side view of an embodiment of a plasma treated turbine air filter with multiple coatings.

FIG. 7 is a side view of an embodiment of a plasma treated turbine air filter 11. The filter 11 defines a front face 172 (upstream or intake side), a rear face 174 (downstream or exhaust side), a first frame portion 176, and a second frame portion 178. The front face 172 is covered with a first plasma coating 180 and second plasma coating 182, which may be the same or different from one another. The rear face 174 is covered with a third plasma coating 184 and fourth plasma coating 186. Although, FIG. 7 illustrates four coatings, the filter 11 may be covered with any number and arrangement of plasma coatings. For example, the filter 11 may be covered with 1, 2, 3, 4, 5, 6, 7, 8, 9, 10, or more plasma coatings, which may be the same or differ from one another.

Specifically, the first plasma coating 180 and second plasma coating 182 may be hydrophobic coatings, while the third plasma coating 184 and fourth plasma coating 186 are hydrophilic coatings. As explained above, hydrophobic coatings on the front face 172 of the filter 11 block or repel moisture from entering the filter 11, while hydrophilic coatings on the rear face 174 absorb moisture that passes through the hydrophobic coatings. In this manner, the plasma coatings combine to protect the gas turbine 12 from moisture.

In still other embodiments, the first plasma coating 180 and third plasma coating 184 may enhance filtration (e.g., moisture or particulate), while the second coating 182 and fourth coating 186 increase filter strength, increase chemical/corrosion resistance, improve abrasion resistance, or any combination thereof, or vice versa. For example, the third and fourth plasma coatings 182, 186 may be hydrophobic coatings that protect the filter 11 in a moisture rich environment (e.g., fog). In still other embodiments, the first and third plasma coatings 180 and 184 may be coatings that increase the strength of the filter 11, while the second and fourth plasma coatings 182, 186 enhance filtration (e.g., moisture or particulate). In another embodiment, the first and third plasma coatings 180, 184 may enhance filtration, while the second and fourth plasma coatings 182, 186 protect the first and third coatings 180, 184 in an abrasive environment (e.g., a desert environment). Table 2 below illustrates other possible combinations of plasma coatings, but is not intended to be limiting.

TABLE 2

| First Plasma Coating 180 | Second Plasma Coating 182 | Third Plasma Coating 184 | Fourth Plasma Coating 186 |
|---|---|---|---|
| Wear resistance | Hydrophobic | Chemical/Corrosion Resistance | Hydrophilic |
| Wear resistance | Hydrophilic | Chemical/Corrosion Resistance | Hydrophilic |
| Hydrophobic | Hydrophobic | Hydrophilic | Hydrophilic |
| Chemical/Corrosion Resistance | Hydrophobic | Hydrophilic | Hydrophilic |
| Wear resistance | Hydrophilic | Hydrophilic | Chemical/Corrosion Resistance |

Technical effects of the invention include the ability to enhance filter properties post fabrication using plasma deposition techniques. The filter may include one or more plasma coatings that enhance its ability to filter air or improve another property. As explained above, the filter may include 2 or more different coatings on the same or different regions of the filter, such as upstream and downstream sides of the filter. For example, the filter may have a hydrophobic coating on one side of the filter and a hydrophilic coating on the opposite side of the filter. The combination of these different plasma coatings may advantageously assist in repelling and draining moisture from a filter. In addition, the different plasma coatings may improve strength, wear resistance, abrasion resistance, corrosion resistance, chemical resistance, biological resistance, or any combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
receiving a filter unit in a plasma treatment system, wherein the filter unit comprises a filter media assembled with a framework; and
applying a first and a second plasma treatment coating to the filter unit via the plasma treatment system, wherein applying the first and second plasma treatment comprises covering an intake side of the filter unit with the first plasma treatment coating, and covering an exhaust side of the filter unit with the second plasma treatment coating.

2. The method of claim 1, wherein applying the first and second plasma treatment coating comprises covering all of the filter unit with the first and second plasma treatment coating.

3. The method of claim 1, wherein applying the first plasma treatment coating comprises covering a first region of the filter unit, applying the second plasma treatment coating comprises covering a second region of the filter unit, the first and second regions are different from one another, and the first and second plasma treatment coatings are different from one another.

4. The method of claim 3, wherein covering the first region of the filter unit comprises covering an intake side of the filter unit with the first plasma treatment coating, and covering the second region of the filter unit comprises covering an exhaust side of the filter unit with the second plasma treatment coating.

5. The method of claim 3, wherein the first and second plasma treatment coatings comprise different thicknesses, different properties, different materials, or combinations thereof.

6. The method of claim 1, wherein the first plasma treatment coating comprises a hydrophilic coating and the second plasma coating comprises a hydrophobic coating.

7. The method of claim 1, comprising removing the filter unit from a gas turbine system prior to receiving the filter unit in the plasma treatment system.

8. The method of claim 1, wherein the filter unit is used prior to receiving the filter unit in the plasma treatment system.

9. The method of claim 1, wherein applying the first and second plasma treatment coatings to the filter unit comprises creating a moisture barrier to protect a gas turbine engine from moisture in an air intake.

10. A method, comprising:
receiving a prefabricated filter unit in a plasma treatment system; and
applying at least one plasma treatment coating to the prefabricated filter unit via the plasma treatment system, wherein the at least one plasma treatment coating comprises applying different first and second plasma treatment coatings, the first plasma treatment coating covers an intake side of the filter unit and the second plasma treatment coating covers an exhaust side of the filter unit to provide a moisture barrier.

11. The method of claim 10, wherein the prefabricated filter unit comprises a filter media preformed into a plurality of protrusions or recesses.

12. The method of claim 10, wherein the prefabricated filter unit comprises a filter media preassembled with a framework.

13. The method of claim 10, comprising controlling the plasma treatment system to provide non-uniformity in the at least one plasma treatment coating along the prefabricated filter unit.

14. The method of claim 10, wherein covering the first region of the prefabricated filter unit comprises covering an intake side of the prefabricated filter unit with the first plasma treatment coating, and covering the second region of the prefabricated filter unit comprises covering an exhaust side of the prefabricated filter unit with the second plasma treatment coating.

15. A system, comprising:
a filter unit comprising a filter media assembled with a framework, wherein the filter unit comprises at least one plasma treatment coating disposed over the filter media and the framework and coating an intake side and an exhaust side of the filter unit, and the at least one plasma treatment coating provides a moisture barrier.

16. The system of claim 15, wherein the at least one plasma treatment coating comprises a first plasma treatment coating disposed along a first region, a second plasma treatment coating disposed along a second region, the first and second regions are different from one another, and the first and second plasma treatment coatings are different from one another.

17. The system of claim 15, the system comprising a gas turbine engine.

18. The method of claim 4, wherein the first plasma treatment coating is hydrophobic, and the second plasma treatment coating is hydrophilic.

19. The system of claim 15, wherein the at least one plasma treatment coating comprises a first hydrophobic plasma treatment covering the intake side and a second hydrophilic plasma treatment covering the exhaust side.

20. The system of claim 15, wherein the filter unit is a turbine filter unit.

* * * * *